United States Patent
Lerouvreur et al.

(10) Patent No.: US 10,001,081 B2
(45) Date of Patent: Jun. 19, 2018

(54) THRUST REVERSER FOR AN AIRCRAFT TURBOJET ENGINE NACELLE

(71) Applicant: Safran Nacelles, Gonfreville l'Orcher (FR)

(72) Inventors: Mathieu Lerouvreur, Gonfreville l'Orcher (FR); Rodolphe Denis, Gonfreville l'Orcher (FR); Florent Lanfranchi, Gonfreville l'Orcher (FR)

(73) Assignee: SAFRAN NACELLES, Gonfreville l'orcher (FR)

( * ) Notice: Subject to any disclaimer, the term of this patent is extended or adjusted under 35 U.S.C. 154(b) by 0 days. days.

(21) Appl. No.: 15/706,812

(22) Filed: Sep. 18, 2017

(65) Prior Publication Data
US 2018/0112626 A1 Apr. 26, 2018

Related U.S. Application Data

(63) Continuation of application No. PCT/FR2016/050572, filed on Mar. 15, 2016.

(30) Foreign Application Priority Data

Mar. 17, 2015 (FR) ...................................... 15 52190

(51) Int. Cl.
*F02K 1/72* (2006.01)
*F02K 1/76* (2006.01)
*F02K 1/12* (2006.01)

(52) U.S. Cl.
CPC .............. *F02K 1/72* (2013.01); *F02K 1/1261* (2013.01); *F02K 1/763* (2013.01); *F05D 2220/323* (2013.01)

(58) Field of Classification Search
CPC . F02K 1/72; F02K 1/763; F02K 1/625; F02K 1/12; F02K 1/09; F02K 1/1261; F05D 2270/64; F05D 2270/65
See application file for complete search history.

(56) References Cited

U.S. PATENT DOCUMENTS 3,814,324 A 6/1974 Wanger
8,511,062 B2 * 8/2013 Ramlaoui ................ F02K 1/09
239/265.27
(Continued)

FOREIGN PATENT DOCUMENTS

EP 2466101 6/2012
FR 2929998 10/2009
(Continued)

OTHER PUBLICATIONS

International Search Report for International Application PCT/FR2016/050572, dated Jun. 16, 2016.

*Primary Examiner* — Andrew Nguyen
(74) *Attorney, Agent, or Firm* — Burris Law, PLLC

(57) ABSTRACT

The present disclosure concerns a thrust reverser for an aircraft turbojet engine nacelle including at least one movable thrust reverser cowling, a means for locking the cowling, an outlet nozzle having a variable cross-section that is arranged in the downstream extension of said cowling and that is movable, and at least one actuator that includes an actuating rod capable of moving the variable nozzle and the movable cowling, remarkable in that the reverser is provided with a passive coupler.

9 Claims, 3 Drawing Sheets

(56) References Cited

U.S. PATENT DOCUMENTS

2009/0288386 A1\* 11/2009 Marshall .................. F02K 1/09
 60/204
2015/0108249 A1\* 4/2015 James ..................... F02K 1/76
 239/265.19

FOREIGN PATENT DOCUMENTS

| JP | 2003269253 | 9/2003 |
| WO | 2015001276 | 1/2015 |

\* cited by examiner

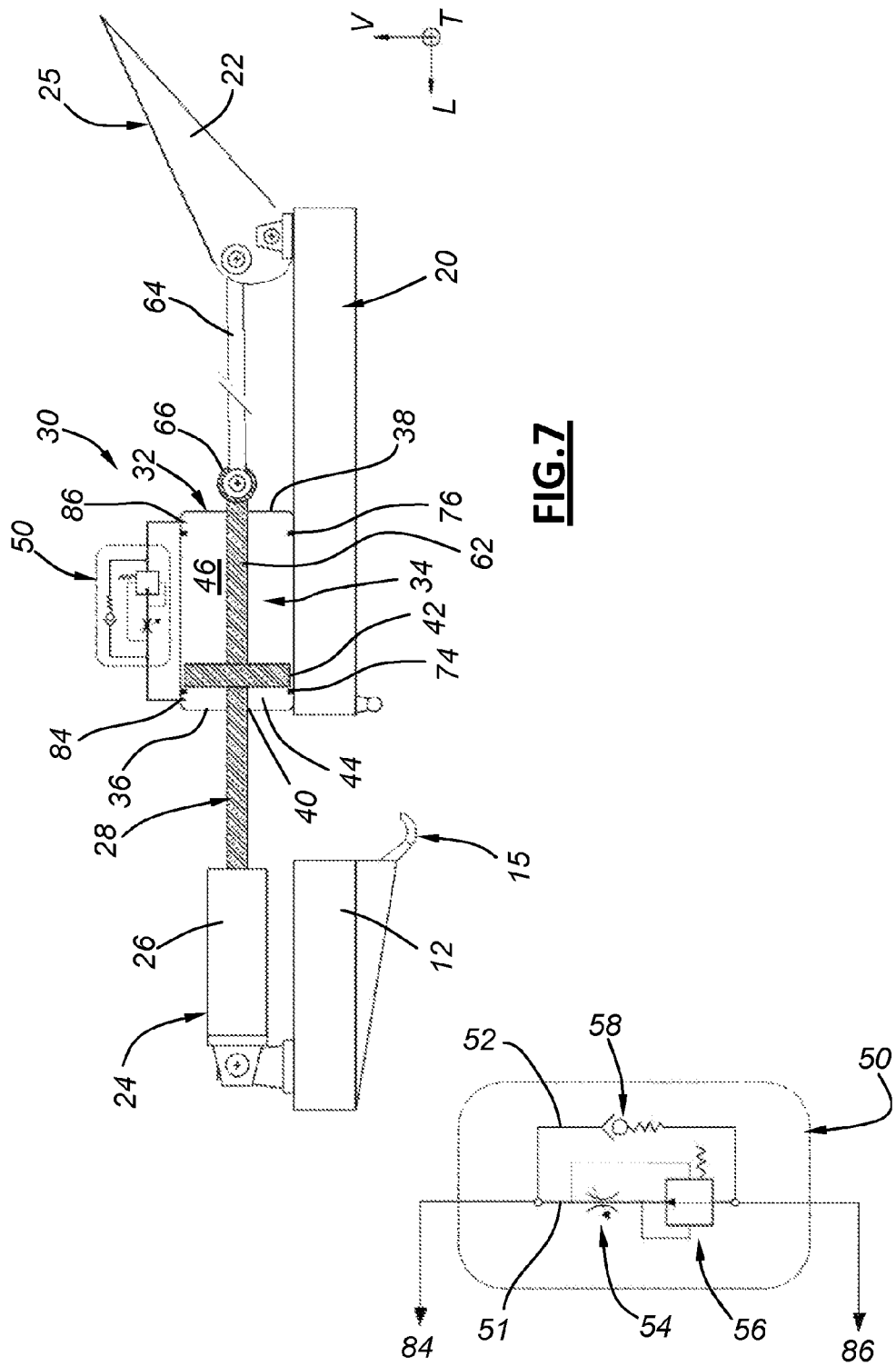

THRUST REVERSER FOR AN AIRCRAFT TURBOJET ENGINE NACELLE

CROSS-REFERENCE TO RELATED APPLICATIONS

This application is a continuation of International Application No. PCT/FR2016/050572, filed on Mar. 15, 2016, which claims priority to and the benefit of FR 15/52190 filed on Mar. 17, 2015. The disclosures of the above applications are incorporated herein by reference.

FIELD

The present disclosure relates to the coupling of a thrust reverser for an aircraft turbojet engine nacelle with an associated variable-section nozzle.

BACKGROUND

The statements in this section merely provide background information related to the present disclosure and may not constitute prior art.

An aircraft is driven by several turbojet engines each housed in a nacelle accommodating an assembly of auxiliary actuating devices linked to its operation and providing various functions when the turbojet engine is in operation or stopped.

These auxiliary actuating devices comprise in particular a mechanical thrust reverser system.

A turbojet engine nacelle generally has a substantially tubular structure comprising an air inlet upstream of the turbojet engine, a median section intended to surround a fan of said turbojet engine, a downstream section intended to surround the combustion chamber of the turbojet engine and optionally integrating thrust reversal means, and is generally ended with an ejection nozzle whose outlet is located downstream of the turbojet engine.

The modern nacelles are intended to accommodate a bypass turbojet engine capable of generating, by means of the blades of the rotating fan, a hot air flow (primary flow) and a cold air flow (secondary flow) which circulates outside the turbojet engine through an annular passage, also called flow path, formed between a fairing of the turbojet engine and an inner wall of the nacelle. The two air flows are ejected from the turbojet engine through the rear of the nacelle.

The role of a thrust reverser is, during the landing of an aircraft, to improve the braking capacity of the latter by redirecting forward at least part of the air ejected from the turbojet engine. In this phase, the thrust reverser obstructs at least one portion of the flow path of the cold flow and directs this flow to the front of the nacelle, thereby generating a counter-thrust which is added to the braking of the wheels and air brakes of the aircraft.

In general, the structure of a thrust reverser comprises a thrust reverser cowl displaceable between, on the one hand, a reverse jet position in which it opens into the nacelle a passage intended for the diverted air flow and, on the other hand, a direct jet position in which it closes this passage.

In the case of a thrust reverser with cascade vanes, the reorientation of the air flow is carried out by cascade vanes, associated with thrust reverser flaps blocking at least partially the air flow path, the cowl having only a simple sliding function aimed at discovering or covering these cascade vanes.

The thrust reverser flaps, also called blocking flaps are, in turn, activated and driven by the sliding of the movable cowl until at least partially obstructing the flow path downstream of the cascades, so as to improve the reorientation of the cold air flow.

In a known manner, the cascade vanes are mounted on a front frame serving as a fixed portion of the thrust reverser device and attached to a casing of the fan of the turbojet engine. This front frame also provides the support of cylinders for actuating the movable cowls.

Apart from participating in a thrust reversal function, a movable thrust reverser cowl, through its belonging to the rear section of the nacelle, includes de facto a downstream portion forming the ejection nozzle.

The section of the ejection nozzle can be adapted according to the different flight phases, namely take-off, climb, cruise, descent and landing in order to maintain a desired section of nozzle depending on the regime of the turbojet engine. The nozzle will then be called a variable nozzle.

Such a variable nozzle is associated with an actuating system allowing this variation of section.

There are several solutions for carrying out a variable nozzle.

A first solution is to provide for pivoting end flaps mounted on the movable thrust reverser cowl and whose pivoting results in an increase or a reduction in the outlet section. Such a system is described, in particular, in the document FR 2 929 998.

There are also known panels mounted movable in translation inside the movable thrust reverser cowl, in a telescopic manner, whose recoil or retraction similarly causes the increase or the reduction of the outlet section.

In the context of a thrust reverser provided with a variable-section nozzle, it is known to actuate the deployment of the movable cowl and the mechanism for varying the section of the variable nozzle by the same cylinders, the movable cowl and the variable nozzle being coupled and uncoupled by a coupling device.

This coupling device selectively links the cowl and the variable nozzle in a rigid manner, the variable nozzle being free when the cowl is locked on the structure of the thrust reverser in its direct jet position and the variable nozzle being coupled on the cowl when the cowl is unlocked, so that the nozzle and the cowl are simultaneously driven in displacement.

This type of coupling device is generally relatively complex, it often requires an alignment of different parts to allow the coupling of the cowl and of the variable nozzle.

The high number of parts of this type of coupling device is a source of failure and often leads to an average reliability.

In addition, the coupling and uncoupling jolts are not damped and can lead to stresses which are detrimental in terms of wear and reliability of the mechanical parts.

SUMMARY

The present disclosure provides a thrust reverser for an aircraft turbojet engine nacelle comprising at least:

one thrust reverser cowl movable in translation along a direction substantially parallel to a longitudinal axis of the aircraft turbojet engine nacelle between a direct jet position and a reverse jet position, one outlet nozzle with a variable section which is arranged in the downstream extension of said cowl and which is movable between at least one reduced ejection section position, one increased ejection section position and one intermediate neutral position, and one actuator which comprises a body mounted on a fixed structure of the thrust reverser and an actuating rod, said rod being adapted to drive in displacement the variable nozzle and the movable cowl, said thrust reverser being remarkable in that it comprises a passive coupler including:

a hollow housing secured to the thrust reverser cowl, and which delimits internally a cavity extending axially generally along the axis of the actuating rod and which is delimited radially by a radial upstream wall and by a radial downstream wall;

a piston fastened on the actuating rod of the actuator and which is slidably mounted in the housing of the coupler by hermetically dividing said cavity into two compartments comprising an upstream compartment located between the upstream wall and the piston and a downstream compartment located between the downstream wall and the piston, each compartment being filled with a fluid; and a unidirectional flow limiter providing the fluid connection between the two compartments, said flow limiter limiting the fluid circulation rate in the direction of a fluid flow from the downstream compartment to the upstream compartment, and enabling a free circulation of the fluid in the direction of a fluid flow from the upstream compartment to the downstream compartment.

The thrust reverser proposed by the present disclosure is simpler, lighter, more compact and more reliable than the thrust reversers using relative locks of the nozzle and of the movable thrust reverser cowl.

Indeed, the thrust reverser according to the present disclosure is devoid of control means, it does not require any device for synchronizing or aligning the thrust reverser cowl and the nozzle.

Advantageously, in the reduced ejection section position for the nozzle, the piston is substantially in abutment against the downstream wall of the housing.

It is meant by "substantially in abutment against the downstream wall of the housing", the fact that the piston abuts against a downstream abutment member (for example an O-ring seal) placed close to the downstream wall of the housing, with a sufficient spacing vis a vis this downstream wall so that the piston does not plug the downstream orifice in fluid communication with the flow limiter.

Still advantageously, in the increased ejection section position for the nozzle, the piston is substantially in abutment against the upstream wall of the housing.

It is meant by "substantially in abutment against the upstream wall of the housing," the fact that the piston abuts against an upstream abutment member (for example an O-ring seal) placed close to the upstream wall of the housing, with a sufficient spacing vis-à-vis this upstream wall so that the piston does not plug the upstream orifice in fluid communication with the flow limiter.

In a first sequence, when it is desired to increase the outlet section of the nozzle, starting from a reduced or neutral section, the thrust reverser cowl is located in the locked position relative to the fixed structure of the aircraft turbojet engine nacelle (direct jet position), and the actuator is controlled in order to displace the actuating rod upstream (direction of retraction of the rod). During this displacement of the actuating rod, the piston displaces the fluid contained in the upstream compartment of the housing in the direction of the downstream compartment through the flow limiter. The fluid thus passes through the flow limiter which enables, in this direction, a free circulation of the fluid. Thus, the actuating rod, secured to the piston, drives in displacement the variable nozzle in order to increase the outlet section of the nozzle.

In a second sequence, when it is desired to reduce the outlet section of the nozzle, starting from an increased or neutral section, the thrust reverser cowl is located in the locked position relative to the fixed structure of the aircraft turbojet engine nacelle (direct jet position), and the actuator is controlled in order to displace the actuating rod downstream (direction of deployment of the rod) at a given first deployment speed. During this displacement of the actuating rod, the piston displaces the fluid contained in the downstream compartment of the housing in the direction of the upstream compartment through the flow limiter. The fluid thus passes through the flow limiter which tends to limit, in this direction, the fluid circulation rate. However, since this first deployment speed is relatively low, and since the housing remains fixed (or static) because it is secured to the thrust reverser cowl which is locked, the piston is displaced downstream and forces the fluid towards the upstream compartment of the housing, so that the actuating rod, secured to the piston, drives in displacement the variable nozzle to reduce the outlet section of the nozzle.

In a third sequence, when it is desired to actuate the thrust reverser cowl in order to switch it from the direct jet position to the reverse jet position, the thrust reverser cowl is first unlocked from the fixed structure of the aircraft turbojet engine nacelle. Thus, the thrust reverser cowl, and therefore the housing, are free to be displaced downstream. Then, the actuator is controlled in order to displace the actuating rod downstream at a given second deployment speed more important than the aforementioned first deployment speed, starting from an increased ejection section position for the nozzle. With such a second displacement speed of the actuating rod, and therefore of the piston, this piston displaces the fluid contained in the downstream compartment of the housing in the direction of the flow limiter. In this direction of circulation of the fluid, the flow limiter limits the fluid circulation rate and thus strongly brakes the passage of the fluid in the direction of the upstream compartment. Thus, the flow limiter strongly brakes the relative displacement of the piston relative to the housing. Consequently, the relative displacement of the actuating rod relative to the thrust reverser cowl is also inhibited, which inhibits any pivoting of the nozzle. The housing transmits, in turn, the translation movement of the actuating rod to the thrust reverser cowl, driving then the switching of the cowl from a direct jet position to a reverse jet position.

In a fourth sequence, when it is desired to actuate the thrust reverser cowl in order to switch it from the reverse jet position to the direct jet position, it is sufficient to control the actuator in order to displace the actuating rod upstream (direction of retraction of the rod). At the beginning of this fourth sequence, the nozzle is in the increased ejection section position and therefore the piston is substantially in abutment against the upstream wall of the housing. Thus, during the retraction of the actuating rod, this actuating rod directly drives the cowl towards the direct jet position, the piston remaining substantially in abutment against the upstream wall of the housing, until the cowl is finally locked. During this fourth sequence, the piston remains all along substantially in abutment against the upstream wall of the housing, so that the fluid undergoes no displacement. Finally, it suffices to reduce the outlet section of the nozzle according to the aforementioned second sequence.

According to another characteristic, the flow limiter comprises a first pipe providing the fluid connection between the two compartments of the housing, said hydraulic device integrating on its first pipe a throttle valve.

Advantageously, the throttle valve is adjustable.

According to another characteristic, the flow limiter integrates on its first pipe a pressure regulator.

According to a form of the present disclosure, the pressure regulator is placed on the first pipe having its inlet in direct connection with the downstream compartment of the housing and having its outlet in direct connection with the throttle valve.

According to another form of the present disclosure, the flow limiter comprises a second pipe in parallel with the first pipe and providing the fluid connection between the two compartments of the housing, said flow limiter integrating on its second pipe a check valve inhibiting the circulation of the fluid in this second pipe in the direction of a fluid flow from the downstream compartment to the upstream compartment.

The present disclosure also concerns an aircraft turbojet engine nacelle equipped with a thrust reverser according to the present disclosure.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 7 is a schematic detail view in longitudinal section, which illustrates the passive coupler of FIG. 2 in a position corresponding to a reverse jet position of the movable cowl of the thrust reverser according to the teachings of the present disclosure; and FIG. 8 is a schematic and zoomed view of the passive coupler of FIG. 2 according to the teachings of the present disclosure.

Figure 1:
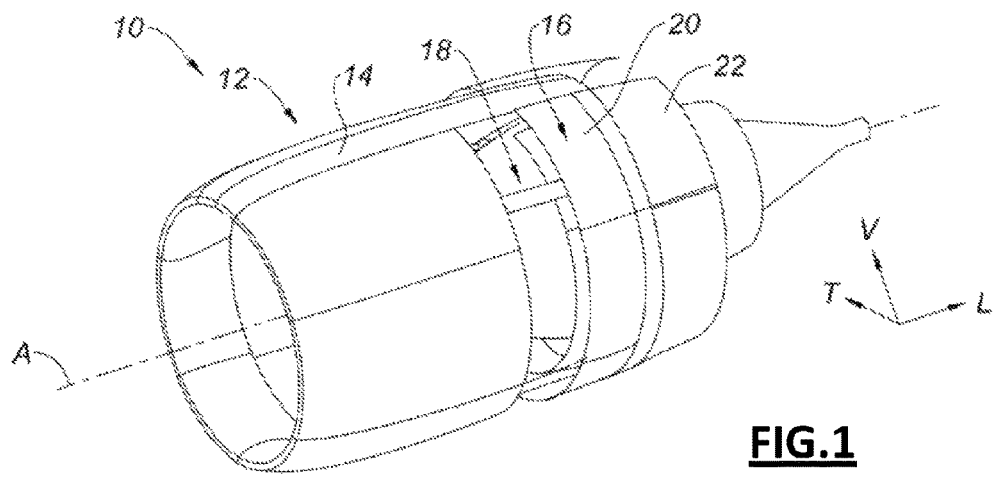
FIG. 1 is an overall perspective view, which illustrates an aircraft turbojet engine turbojet engine nacelle equipped with a thrust reverser and a variable nozzle.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In the description and claims, the longitudinal, vertical and transverse terminology will be used without restriction with reference to the trihedron L, V, T indicated in figures, whose axis L is parallel to the axis of the aircraft turbojet engine nacelle.

It should be also noted that, in the present patent application, the terms "upstream" and "downstream" must be understood relative to the circulation of the air flow inside the propulsion unit formed by the nacelle and the turbojet engine, that is to say from the left to the right of FIGS. 1 to 7.

In all of these figures, identical or similar references represent identical or similar organs or assemblies of organs.

FIG. 1 shows a turbojet engine nacelle 10 for an aircraft, which extends axially along a longitudinal axis A.

The aircraft turbojet engine nacelle 10 includes a fixed front portion 12 which includes a central fastening beam 14 on the aircraft, and a movable rear portion 16.

The movable rear portion 16 includes a thrust reverser 18 which comprises a thrust reverser cowl 20 and a variable-section ejection nozzle 22 arranged in the downstream extension of the cowl 20.

Figure 2:
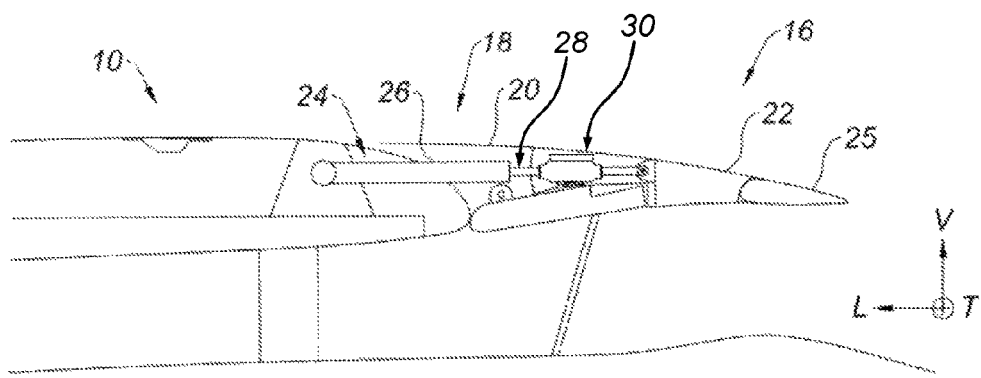
FIG. 2 is a schematic view in longitudinal section, which illustrates the movable cowl of the thrust reverser in the direct jet position and the passive coupler according to the present disclosure.
Figure 3:
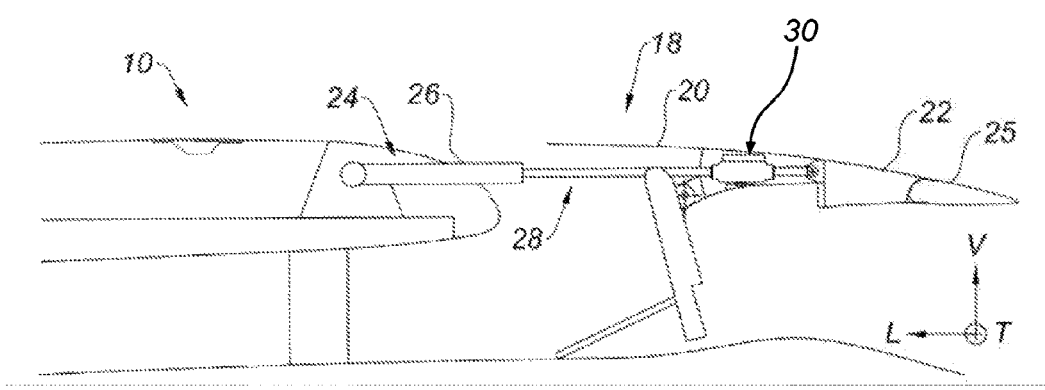
FIG. 3 is a schematic view in longitudinal section, which illustrates the movable cowl of the thrust reverser in the reverse jet position and the passive coupler according to the present disclosure.

The thrust reverser cowl 20 is mounted movable in translation along a direction substantially parallel to the longitudinal axis A of the aircraft turbojet engine nacelle 10, between a direct jet position shown in FIG. 2, in which the cowl 20 opens into the aircraft turbojet engine nacelle 10 a passage intended for the diverted air flow, and a reverse jet position shown in FIG. 3 in which the cowl 20 closes the passage.

The thrust reverser 18 is equipped with means (not shown) for diverting the air flow which are, for example, of the fixed cascade type or of the movable cascade type.

The cowl 20 is driven in displacement by means of a plurality of cylinder 24, only one of which is described below and shown in FIGS. 2 to 5 and 7.

In addition, the cowl 20 is associated with a locking means (not shown in FIGS. 2 and 3 and having the reference 15 in FIGS. 4 to 7) allowing to immobilize the cowl 20 in its direct jet position (shown in FIGS. 2, 4, 5 and 6) and to release the cowl 20 so that it can switch into the reverse jet position (shown in FIGS. 3 and 7) selectively.

Figure 4:
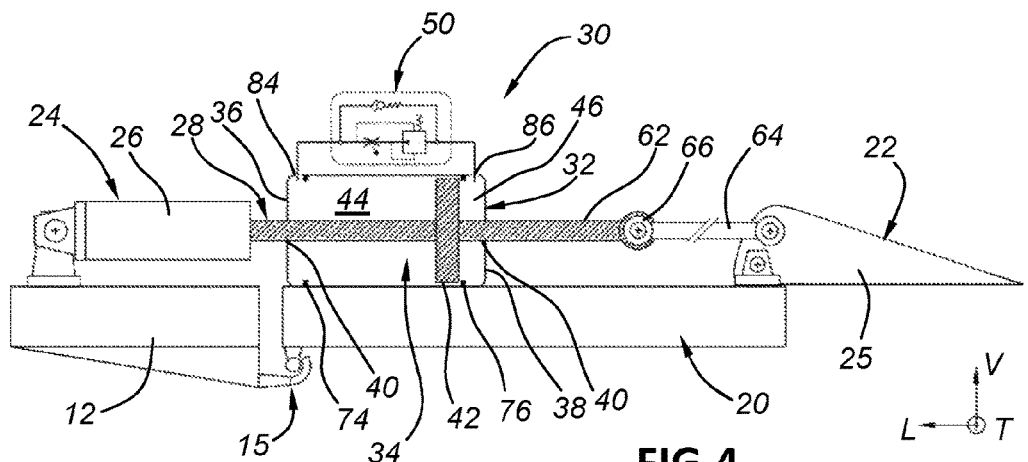
FIG. 4 is a schematic detail view in longitudinal section, which illustrates the passive coupler of FIG. 2 in a position corresponding to a reduced ejection section position of the nozzle according to the teachings of the present disclosure.
Figure 5:
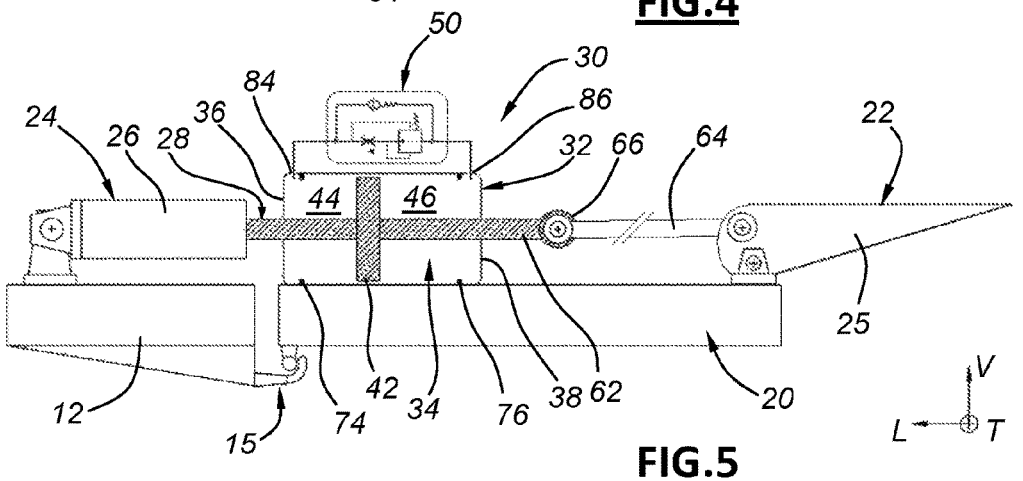
FIG. 5 is a schematic detail view in longitudinal section, which illustrates the passive coupler of FIG. 2 in a position corresponding to an intermediate neutral position of the nozzle according to the teachings of the present disclosure.
Figure 6:
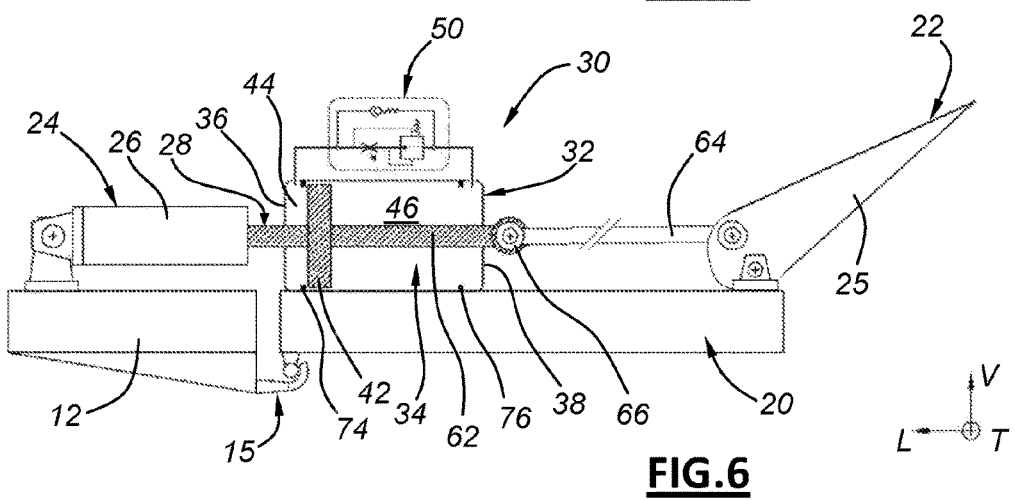
FIG. 6 is a schematic detail view in longitudinal section, which illustrates the passive coupler of FIG. 2 in a position corresponding to an increased ejection section position of the nozzle according to the teachings of the present disclosure.

The variable-section outlet nozzle 22 is movably mounted on the movable portion 16 between at least one reduced ejection section position illustrated in FIG. 4, one increased ejection section position illustrated in FIG. 6 and one intermediate neutral position illustrated in FIG. 5.

Each of the positions of the nozzle 22 here corresponds to a distinct inclination of the flaps 25 (only one of which is shown in FIGS. 2 to 7) which are pivotally mounted on the cowls 20 of the thrust reverser 18 in order to vary the ejection section of the nozzle 22.

For this purpose, the cylinder 24 includes a body 26 mounted on the fixed structure of the thrust reverser 18 and an actuating rod 28 which is adapted to selectively drive in displacement the variable nozzle 22 or the assembly constituted by the variable nozzle 22 and the movable cowl 20.

To this end, the thrust reverser 18 is equipped with a passive coupler 30, shown in detail in FIGS. 4 to 6, which includes a housing 32 fastened on the thrust reverser cowl 20.

The housing 32 of the coupler 30 internally delimits a cavity 34 having a hollow cylindrical shape which extends axially along an axis (not schematized) parallel to the axis of the rod 28 for actuating the cylinder 24.

The cavity 34 is delimited radially by a radial upstream wall 36 and by an radial downstream wall 38 which are opposite and each pierced by a through-hole 40 along the axis B, for the passage of the actuating rod 28 which passes through the housing 32 from side to side.

In addition, the coupler 30 includes a piston 42 which is fastened on the actuating rod 28 and which is slidably mounted in the body 32 of the coupler 30, by hermetically dividing the cavity 34 into an upstream compartment 44 and into a downstream compartment 46. Each compartment 44, 46 is filled with an incompressible hydraulic fluid, such as, for example, the Skydrol® AS1241 type IV and V fluids marketed by the Eastman Company. The upstream compartment 44 is provided with an upstream orifice 84 placed at the periphery close to the upstream wall 36 and the downstream compartment 46 is provided with a downstream orifice 86 placed at the periphery close to the downstream wall 38.

The coupler 30 is configured such that:

as shown in FIG. 4, in the reduced ejection section position for the nozzle 22, the piston 42 is substantially in abutment against the downstream wall 38 of the housing 32, and more precisely the piston 42 is in abutment against a downstream abutment member 76 (for example, an O-ring seal) placed close to the downstream wall 38 of the housing 32, with a sufficient spacing vis-à-vis this downstream wall 38 so that the piston 42 does not plug the downstream orifice 86;

as shown in FIG. 6, in the increased ejection section position for the nozzle 22, the piston 42 is substantially in abutment against the upstream wall 36 of the housing 32, and more precisely the piston 42 is in abutment against an upstream abutment member 74 (for example, an O-ring seal) placed close to the upstream wall 36 of the housing 32, with a sufficient spacing vis-à-vis this upstream wall 36 so that the piston 42 does not plug the upstream orifice 84; and as shown in FIG. 5, in the neutral intermediate position for the nozzle 22, the piston 42 is located halfway between the downstream wall 38 and the upstream wall 36 of the housing 32.

Also, the coupler 30 is equipped with a unidirectional flow limiter 50 providing the fluid connection between the two compartments 44, 46 of the housing 42, via respectively the upstream orifice 84 and the downstream orifice 86. This hydraulic flow limiter 50 is designed to:

limit the fluid circulation rate in the direction of a fluid flow flowing from the downstream compartment 46 to the upstream compartment 44, and enable a free circulation of the fluid in the direction of a fluid flow flowing from the upstream compartment 44 to the downstream compartment 46.

The piston 42 is full, so that the two compartments 44, 46 cannot communicate fluidly through the piston 42, but can communicate fluidly only via the flow limiter 50, through the orifices 84, 86.

More particularly, and with reference to FIG. 8, the flow limiter 50 comprises a first pipe 51 and a second pipe 52 in parallel and providing the fluid connection between the two compartments 44, 46. This flow limiter 50 is equipped with:

an adjustable or non-adjustable throttle valve 54 placed on the first pipe 51, this throttle valve 54 forming a variable or non-variable fluid restriction;

a pressure regulator 56 placed on the first pipe 51 having its inlet in direct connection with the downstream compartment 46 and having its outlet in direct connection with the throttle valve 54; and a check valve 58 placed on the second pipe 52, this check valve 58 inhibiting the circulation of the fluid in this second pipe 52 in the direction of a fluid flow from the downstream compartment 46 to the upstream compartment 44.

The flow limiter 50 is adjusted so that, when the cowl 20 is unlocked (as shown in FIG. 7) and when the actuator 24 is controlled to displace the rod 28 downstream in order to switch the cowl 20 from a position, the flow limiter 50 opposes the displacement of the fluid from the downstream compartment 46 to the upstream compartment 44, and thus opposes the relative displacement of the actuating rod 28 relative to the housing 32, and therefore relative to the cowl 20, to allow driving in displacement the assembly constituted by the cowl 20 and the nozzle 22.

Conversely, when the cowl 20 is locked, the cylinder 24 drives the actuating rod 28 against the fluid displacements which damp the displacements of the rod 28, in order to allow driving in displacement the nozzle 22.

Four sequences are possible with this thrust reverser 18.

In a first sequence, it is desired to increase the outlet section of the nozzle 22, starting from a reduced section (illustrated in FIG. 4) or a neutral section (illustrated in FIG. 5), up to an increased section (illustrated in FIG. 6); the thrust reverser cowl 20 being located in the locked position relative to the fixed structure 12 of the aircraft turbojet engine nacelle, so that the housing 32 is fixed or static. In this first sequence, the actuator 24 is controlled in order to displace the actuating rod 28 upstream (direction of retraction of the rod 28, leftward in FIG. 4). During this displacement of the actuating rod 28, the piston 42 displaces the fluid contained in the upstream compartment 44 of the housing 32 in the direction of the downstream compartment 46 through the flow limiter 50. The fluid thus passes through the flow limiter 50 in its second pipe 52, via the check valve 58, and this flow limiter 50 enables, in this direction, a free circulation of the fluid. Thus, the actuating rod 28, secured to the piston 42, is displaced relative to the static housing 32 and it drives in displacement the flap 25 of the variable nozzle 22 to increase the outlet section of the nozzle 22.

In a second sequence, it is desired to reduce the outlet section of the nozzle 22, starting from an increased section (illustrated in FIG. 6) or a neutral section (illustrated in FIG. 5) up to a reduced section (illustrated in FIG. 4); the thrust reverser cowl 20 being located in the locked position relative to the fixed structure 12 of the aircraft turbojet engine nacelle, so that the housing 32 is fixed or static. In this second sequence, the actuator 24 is controlled in order to displace the actuating rod 28 downstream (direction of deployment of the rod 28, rightward in FIG. 6) at a first given deployment speed. During this displacement of the actuating rod 28, the piston 42 displaces the fluid contained in the downstream compartment 46 of the housing 32 in the direction of the upstream compartment 44 through the flow limiter 50. The fluid does not circulate in the second pipe 52 because of the check valve 58 and passes through the pressure regulator 56 then the throttle valve 54. Since this first deployment speed is relatively low and since the housing 32 is static, the piston 42 is displaced downstream and forces the fluid towards the upstream compartment 44 of the housing 32, so that the actuating rod 28, secured to the piston, drives in displacement the flap 25 of variable nozzle 22 to reduce the outlet section of the nozzle 22.

In a third sequence, it is desired to actuate the thrust reverser cowl 20 in order to switch it from the direct jet position (illustrated in FIGS. 2 and 4) to the reverse jet position (illustrated in FIG. 7). First of all, the thrust reverser cowl 20 is unlocked from the fixed structure 12 of the aircraft turbojet engine nacelle 10. Thus, the thrust reverser cowl 20, and therefore the housing 32, are free to be displaced downstream. At the beginning of this third sequence, the nozzle 22 is in the increased ejection section position (as shown in FIG. 6) and therefore the piston 42 is substantially in abutment against the upstream wall 36 of the housing 32. Then, the actuator 24 is controlled in order to displace the actuating rod 28 downstream (direction of deployment of the rod 28, rightward in FIGS. 2 and 6) at a second given deployment speed relatively high relative to the aforementioned first deployment speed. The piston 42 exerts a thrust on the fluid contained in the downstream compartment 46 of the housing 32 in the direction of the flow rite limiter 50. The fluid does not circulate in the second pipe 52 because of the check valve 58, and engages in the first pipe 51 to pass through the pressure regulator 56 then the throttle valve 54. With such a second displacement speed of the actuating rod 28, and therefore of the piston 42, the throttle valve 54 limits the fluid circulation rate and thus limits the passage of the fluid in the direction of the upstream compartment 44. Thus, the flow limiter 50 inhibits the relative displacement of the piston 42 relative to the housing 32. Consequently, the relative displacement of the actuating rod 28 relative to the thrust reverser cowl 20 is also inhibited, which inhibits any pivoting of the nozzle 25. The housing 32 transmits, in turn, the translation movement of the actuating rod 28 to the thrust reverser cowl 20, driving then the switching of the cowl 20 from a direct jet position to a reverse jet position. Finally, it is possible to reduce the section of the nozzle 22 by substantially following the aforementioned second sequence, in other words by deploying the rod 28 according to the first deployment speed.

In a fourth sequence, it is desired to actuate the thrust reverser cowl 20 in order to switch it from the reverse jet position (illustrated in FIG. 7) to the direct jet position (illustrated in FIGS. 2 and 4). The actuator 24 is controlled in order to displace the actuating rod 28 upstream (direction of retraction of the rod 28, leftward in FIG. 7). At the beginning of this fourth sequence, the nozzle 22 is in the increased ejection section position (as shown in FIG. 7) and therefore the piston 42 is substantially in abutment against the upstream wall 36 of the housing 32. Thus, during this displacement of the actuating rod 28, the piston 42 remains in abutment against this upstream wall 36 and the fluid undergoes no displacement, so that the actuating rod 28, secured to the piston 42, drives the cowl 20 directly towards the direct jet position, this cowl being in the end locked. Finally, it suffices to reduce the outlet section of the nozzle 20 by following the aforementioned second sequence.

The deployment speeds of the actuators 24 in the second sequence are extremely low vis-à-vis the speeds in the third sequence. The present disclosure therefore proposes to use the viscous property of fluids, which tends to facilitate the flow at low speed (second sequence) and to limit it at high speed (third sequence). The flow limiter 50 thus acts passively depending on the deployment speed of the actuators 24, to allow the aforementioned different sequences. The housing 32 is of simple and compact construction and proposes, with the flow limiter 50, a passive operation; the flow limiter 50 allowing to easily accommodate the sudden variations of pressure in the housing 32.

According to another aspect, the actuating rod 28 includes a first segment 62 which is slidably mounted in the body 26 of the cylinder 24 and also slidably mounted in the housing 32 of the coupler 30, and a second segment 64 which is hinged on the flap 25 of the nozzle 22. As seen in FIGS. 4, 5 and 7, the first segment 62 and the second segment 64 are linked together by a mechanical connection 66 which, possibly, allows a noticeable offset and an uncoupling of the first segment 62 and of the second segment 64 of the actuating rod 28. This mechanical connection 66 can allow dissociating the first segment 64 from the second segment 66 of the actuating rod 28 during the opening of the cowl 20 in the maintenance configuration.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A thrust reverser for an aircraft turbojet engine nacelle comprising:
    a thrust reverser cowl movable in translation along a direction substantially parallel to a longitudinal axis (A) of the aircraft turbojet engine nacelle, between a direct jet position and a reverse jet position;
    an outlet nozzle with a variable section which is arranged in a downstream extension of said cowl and which is movable between at least one reduced ejection section position, one increased ejection section position and one intermediate neutral position;
    at least one actuator which comprises a body mounted on a fixed structure of the thrust reverser and an actuating rod, said rod being adapted to drive in displacement the variable section of the nozzle and the movable cowl; and
    a passive coupler comprising:
    a hollow housing secured to the thrust reverser cowl, and which delimits internally a cavity extending axially generally along an axis (B) of the actuating rod and which is delimited by a radial upstream wall and by a radial downstream wall;
    a piston fastened on the actuating rod of the at least one actuator and which is slidably mounted in the housing of the passive coupler by hermetically dividing said cavity into two compartments comprising an upstream compartment located between the upstream wall and the piston and a downstream compartment located between the downstream wall and the piston, each compartment being filled with a fluid; and
    a unidirectional flow limiter providing a fluid connection between the two compartments of the housing, said flow limiter limiting a fluid circulation rate in the direction of a fluid flow from the downstream compartment to the upstream compartment, and enabling a free circulation of the fluid in the direction of fluid flow from the upstream compartment to the downstream compartment.

2. The thrust reverser according to claim 1, wherein, in the reduced ejection section position for the nozzle, the piston is in abutment against the downstream wall of the housing.

3. The thrust reverser according to claim 1, wherein, in the increased ejection section position for the nozzle, the piston is in abutment against the upstream wall of the housing.

4. The thrust reverser according to claim 1, wherein the flow limiter comprises a first pipe providing the fluid connection between the two compartments of the housing, a hydraulic device integrating on the first pipe a throttle valve.

5. The thrust reverser according to claim 4, wherein the throttle valve is adjustable.

6. The thrust reverser according to claim 4, wherein the flow limiter integrates on the first pipe a pressure regulator.

7. The thrust reverser according to claim 6, wherein the pressure regulator is placed on the first pipe having its inlet in direct connection with the downstream compartment of the housing and having its outlet in direct connection with the throttle valve.

8. The thrust reverser according to claim 4, wherein the flow limiter comprises a second pipe in parallel with the first pipe and providing the fluid connection between the two compartments of the housing, said flow limiter integrating on the second pipe a check valve inhibiting the circulation of the fluid in the second pipe in the direction of a fluid flow flowing from the downstream compartment to the upstream compartment.

9. An aircraft turbojet engine nacelle equipped with a thrust reverser according to claim 1.

* * * * *